No. 653,197. Patented July 3, 1900.
J. GREEN.
SEED SOWING MACHINE.
(Application filed May 11, 1898.)
(No Model.) 2 Sheets—Sheet 1.
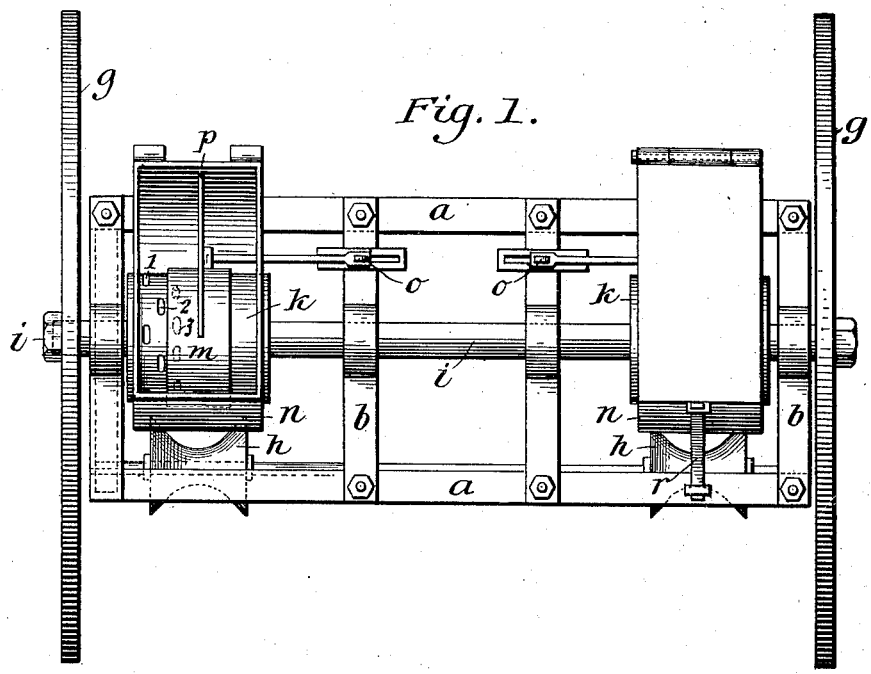
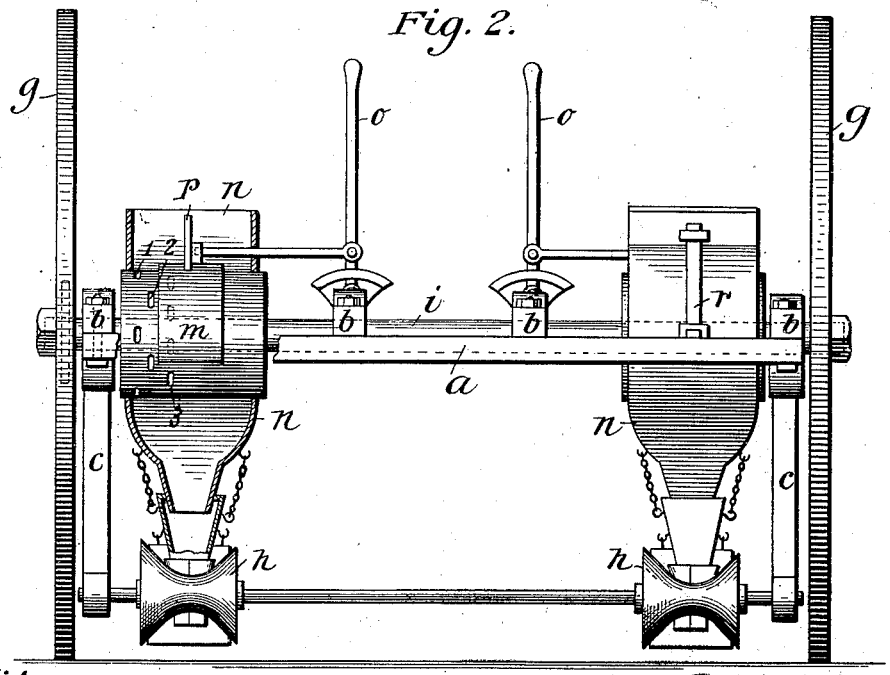
Witnesses
Frank M. Clark
Richard Wheeler
Inventor.
John Green No. 653,197. Patented July 3, 1900.
J. GREEN.
SEED SOWING MACHINE.
(Application filed May 11, 1898.)

(No Model.) 2 Sheets—Sheet 2.

Witnesses. Inventor.
Frank M. Clark John Green
Richard Wheeler

UNITED STATES PATENT OFFICE.

JOHN GREEN, OF TREETON, ENGLAND.

SEED-SOWING MACHINE.

SPECIFICATION forming part of Letters Patent No. 653,197, dated July 3, 1900.

Application filed May 11, 1898. Serial No. 680,422. (No model.)

*To all whom it may concern:*

Be it known that I, JOHN GREEN, a citizen of the United States, residing at 22 Mill Lane, Treeton, county of York, England, have invented new and useful Improvements in Seed-Sowing Machines, of which the following is a specification.

My invention relates to improvements in or connected with machines for sowing seed, and has reference to those machines in which a revolving cylinder having depressions in its periphery is employed at the bottom of a hopper, from which the said depressions receive in rotation a certain quantity of seeds contained in the hopper and discharge them on the land.

The objects of my invention are, first, to provide a more simple means of regulating and distributing the seeds, and, secondly, to discharge them at regular distances apart without in any way destroying or causing them to jam in the depressions. I attain these objects by the mechanism illustrated in the accompanying drawings, in which—

Figure 3:
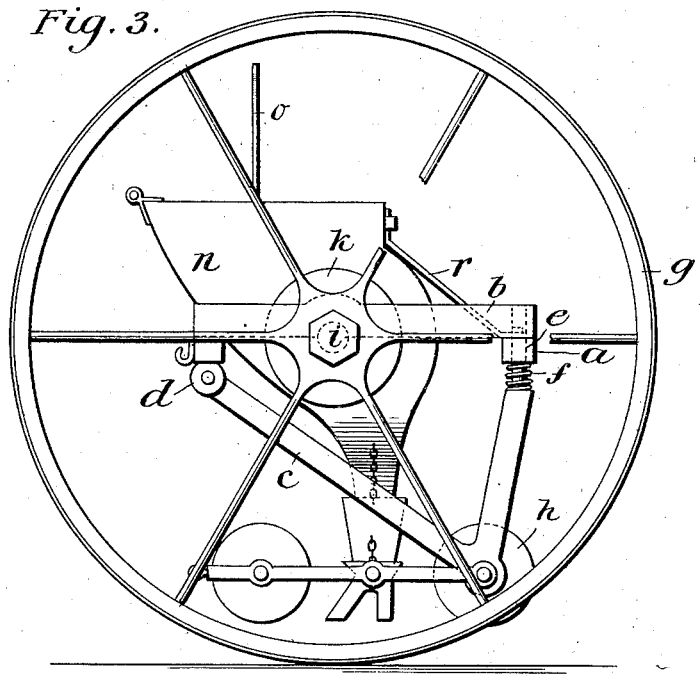
Figure 4:
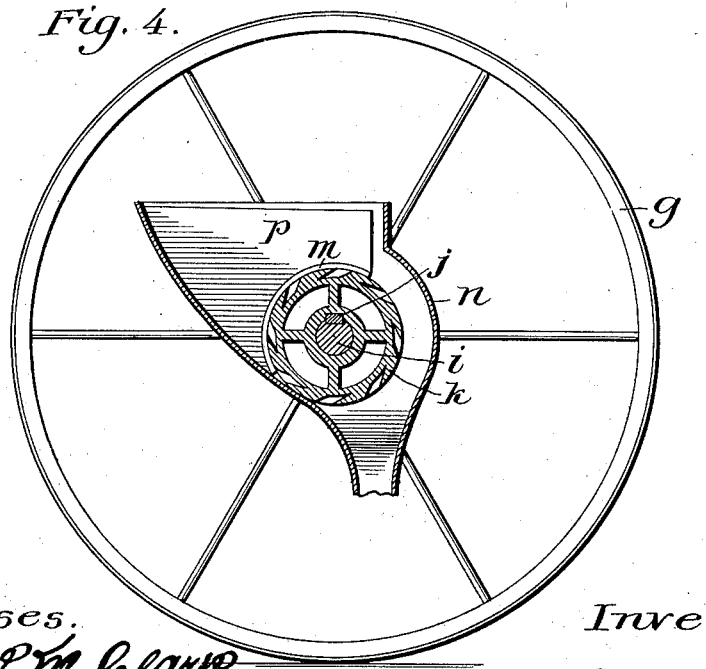

Figure 1 is a plan of the entire machine. Fig. 2 is a front elevation of machine. Fig. 3 is a side elevation of machine. Fig. 4 is a part of side elevation in section showing recesses and adjustable sliding regulating-plate by means of which the distribution of the seed is accomplished.

Similar letters refer to similar parts throughout the several views.

According to my invention I employ a carriage in which the wheels are fastened to the axle, so that when the wheels rotate the axle rotates with them. On or about the said axle I mount one or more drills in suitable number to sow the seed, each drill consisting of a cylinder having one or more sets of recesses in its surface. Around the seed-cylinder a hopper is provided, from the back of which the recesses in the cylinder take the seed. The base of the hopper is connected to the upper part of a spout, and as the cylinder revolves in the hopper the seeds fall into the recesses and are carried over and dropped intermittently on the land. The distance between the seed is controlled and regulated by a close-fitting sliding regulating-plate, which may be set so as to cut off one or more sets of recesses from access to the seed in the hopper. A share is attached to the carriage in front of the spout of the hopper in such a manner that a furrow is cut into the ground for the seed to fall into, and behind the spout two shares are provided for the purpose of closing in the furrow after the seed is received. To cover and securely plant the seed, a suitable roller may be placed behind the shares.

Any number of drills may be constructed on one machine and the adjustable sliding regulating-plates so connected that they may be actuated through the medium of one or more levers.

The recesses in the cylinder may be made of different sizes to suit the size of the seed to be sown and the distance between them made to correspond to the size of the wheels, allowing the seed to be sown in a regular manner and at suitable distances apart.

The upper part of the framework $a$ and the draft-poles $b$ are connected to the upright portion of the framework $c$ at the back by hinges $d$ (see Fig. 3) and to the front by means of a sliding joint $e$, in conjunction with a spiral spring $f$. (See Fig. 3.)

The above may be said to constitute the whole of the framework and is carried by the wheels $g$ and the ridge-rollers $h$. (See Figs. 2 and 3.) The framework is fastened to the axle of the wheels by two strong semicircular straps on the under side of the draft-poles. The wheels $g$ and the seed-cylinder $k$ are fastened to the axle in the following manner: the former by lock-nuts $i$ and the latter by keys $j$. (See Fig. 4.)

The seed-cylinder $k$ and the sliding regulating-plate $m$ (see Fig. 4) fit close up to the back of the hopper $n$, so close that the smallest seed cannot work through into the spout of the hopper but only through its proper medium—the recesses in the cylinder—the peculiar arrangement of which will be noticed. These recesses are placed on lines parallel with one another, but they themselves are not parallel with nor opposite one another. The first set (marked as 1, see Fig. 1) are placed at equal distances apart and represent the maximum distance at which seed is to be sown. The second set (marked as 2) is of the same pitch as 1, but are placed so that they fall half-way between any two consecutive recesses on line 1. The third set is half the pitch of sets 1 and 2, and the recesses are placed so that they fall half-way between the recesses on lines 1 and 2. When the machine is not in use, the regulating-plate $m$ covers the whole of the recesses. When it is desired to sow seed, the regulating-plate $m$ is drawn backward or forward, as the case may be, by the regulating-plate lever $o$, so that the recesses can have access to the seed in the hopper $n$, the distance between the seeds sown being dependent upon the number of sets of recesses exposed. For example, if one set only is exposed, the maximum distance will be sown. If one and two only, then one-half the maximum distance will be sown. If one, two, and three, then one-fourth of the maximum distance will be sown. It will be seen that by placing more sets of recesses on the cylinder, and arranging them in the same mathematical order, a much less distance can be sown.

The hopper $n$ is divided into two portions by means of a vertical plate $p$, fastened onto regulating-plate $m$. (See Fig. 2.) The back of the hopper rests on the back part of the framework, is supported by the axle $i$ in the center, and is prevented from tilting over in front of the machine by the inclined bar $r$. (See Fig. 3.)

The seed-cylinder $k$ may be taken off and a fresh one put on (when required to sow a different kind of seed) at any time by unscrewing the lock-nuts $i$ and taking the keys $j$ out.

I am aware that prior to my invention various patents have been granted in which the cylinders and recesses in them are fed from a hopper above them. I therefore make no claim to such a combination.

Having now described and ascertained the nature of my invention and in what manner the same is to be performed, what I claim, and desire to protect by Letters Patent, is—

In a seed-sowing machine of the class described, the combination of a hopper with a seed-distributing cylinder $k$ provided with recesses 1 and 2 of the same pitch but not in the same axial line of the cylinder, and with another series of recesses of a different pitch around the periphery, means for rotating said cylinder, a sliding plate $m$, and means for operating same, a conducting-spout, share for opening furrow in ground and means for closing said furrow upon the deposited seed substantially as set forth.

JOHN GREEN.

Witnesses:
RICHARD WHEELER,
LILLIE JANE WHEELER.